Dec. 10, 1957 C. A. MENDENHALL 2,815,669
ENGINE STARTER GEARING
Filed Oct. 1, 1956

WITNESS:
Esther M. Stockton

INVENTOR.
Charles A. Mendenhall
BY
Clinton S. Janes
ATTORNEY

United States Patent Office 2,815,669
Patented Dec. 10, 1957

2,815,669

ENGINE STARTER GEARING

Charles A. Mendenhall, Horseheads, N. Y., assignor to Bendix Aviation Corporation, Elmira Heights, N. Y., a corporation of Delaware Application October 1, 1956, Serial No. 613,108

4 Claims. (Cl. 74—7)

The present invention relates to engine starter gearing and more particularly to a drive having a very small outside diameter and length as compared to present commercial drives of comparable torque capacity.

In present automotive design, the continual effort to lower the silhouette of cars while multiplying the auxiliary devices located in and around the engine compartment has caused demands for reduction in size of the starter drives to the point where a small fraction of an inch in diameter or length is a matter of great importance. At the same time, the shift to 12 volt equipment with markedly increased acceleration of the starting motor has made it necessary to provide for higher peak torque and consequent pressures and stresses.

It is an object of the present invention to provide a novel starter drive, the parts of which have adequate strength and endurance but are so designed and assembled as to effect substantial reductions in overall dimensions as compared to conventional starter gearing.

It is another object to provide such a device incorporating means for limiting to a safe value the peak torque to be transmitted by the drive.

It is another object to provide such a device which is simple and economical in construction and assembly, and efficient and durable in operation.

The present invention is in the nature of a modification for the stated objects of the structure shown in the patent to Digby 2,606,449, issued August 12, 1952, and assigned to the assignee of this application.

Figure 1:
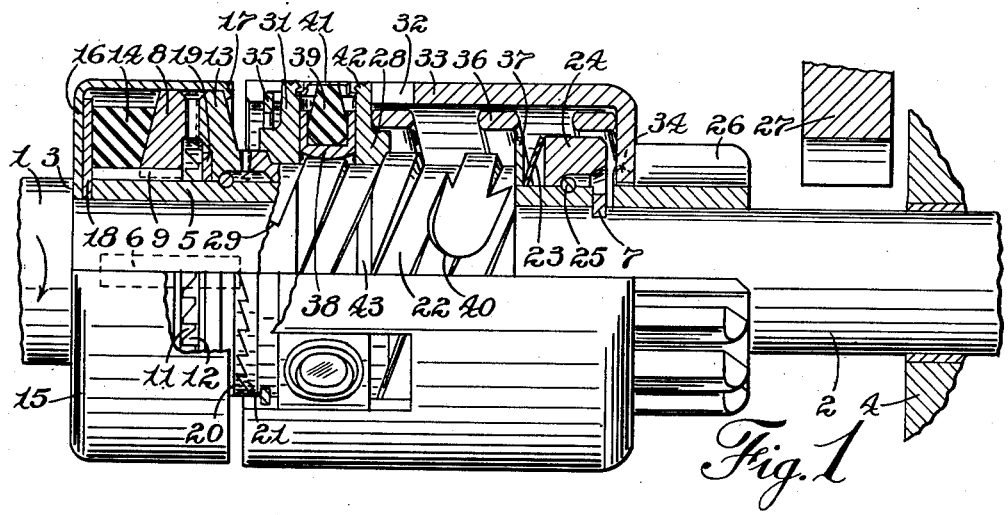
Figure 2:
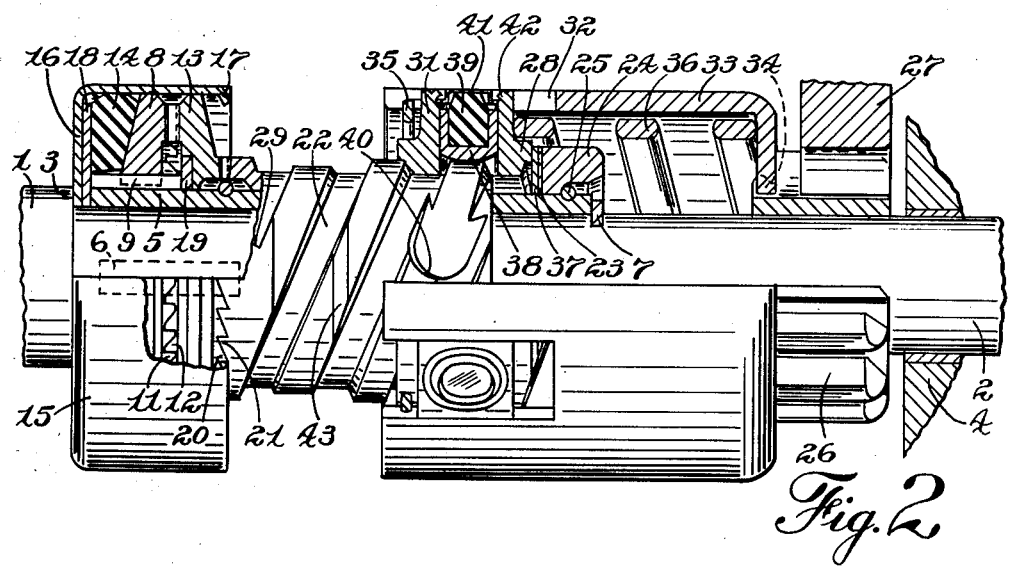

Further objects and advantages will be apparent from the following description taken in connection with the accompanying drawing in which:

Fig. 1 is a side elevation partly broken away and in section of a preferred embodiment of the invention showing the parts in normal or idle position; and Fig. 2 is a view similar to Fig. 1 showing the parts in cranking position.

In Fig. 1 of the drawing there is illustrated a power shaft 1 having a smooth cylindrical extension 2 defined by a radial shoulder 3, and supported at its outer end in an outboard bearing 4. A sleeve 5 is non-rotatably mounted on the extension 2 of the power shaft as by means of a key 6, and is positioned adjacent the shoulder 3 of the power shaft by means of a split abutment ring 7.

A driving coupling member 8 is splined on the sleeve 5 as shown at 9, and is formed with inclined laterally extending driving projections or teeth 11 adapted to co-operate with similarly formed projections 12 on a driven coupling member 13 which is slidably journalled on the sleeve 5. Means for yieldably resisting disengagement of the driving projections 11, 12 is provided comprising a ring 14 of elastically deformable material such as rubber which is held in initial compression against the coupling member 8 by means of a collar 15 surrounding the elastic ring and coupling members and holding them in assembled relation by means of a radial flange 16 at one end, and an inturned lip 17 at the other end engaging the driven coupling member 13. The flange 16 bears on the smooth extension 2 of the power shaft against the shoulder 3, a thrust washer 18 being preferably interposed between the flange 16 and the adjacent end of the sleeve 5. Movement of the driven coupling 13 to the left is limited by engagement of a thrust ring 19 against the ends of the splines 9 on sleeve 5.

The driven coupling member is also provided with overrunning clutch teeth 20 adapted to cooperate with similar clutch teeth 21 on the end of a screw shaft 22 which is slidably journalled on the sleeve 5, the engagement of said teeth being normally maintained by a spring washer 23 interposed between the opposite end of the screw shaft and a stop ring 24 fixed on the end of the sleeve 5 by means of a lock ring 25.

A pinion 26 is slidably journalled on the reduced extension 2 of the power shaft for movement into and out of mesh with a gear 27 of the engine to be started. A control nut 28 is threaded on the screw shaft 22, its idle position thereon being defined by the ends 29 of the threads of the screw shaft. Control nut 28 is formed with a plurality of radially extending lugs 31 which slidably engage in axially extending slots 32 in a barrel member 33 anchored to the pinion 26 as indicated at 34. The lugs 31 are retained in the open end of the barrel 33 by means of a lock ring 35, against which they are normally pressed by a mesh-enforcing spring 36 located in the barrel between the control nut and the closed end of the barrel.

The longitudinal travel of the control nut 28 is limited by the stop ring 24 on sleeve 5, a thrust washer 37 being preferably interposed between the spring washer 23 and the end of the screw shaft 2.

Means are provided for holding the pinion and control nut assembly in meshed position until the parts are rotating above a predetermined speed. As here shown this means comprises a latch member 38 slidably mounted in a radial bore in a lug 31 of the control nut and yieldably pressed against the surface of the screw shaft by means of an elastic member here shown in the form of a truncated cone 39 of elastically deformable material. The elastic member 39 is retained in the bore of the lug 31 by means of a cup member 41 having its rim anchored in the interior of said bore by displacing the inner edge of said lug inwardly as indicated at 42, the parts being so dimensioned that the ends of the lugs 31, and the bottom of the cup member 41 are substantially flush with the outer surface of the barrel 33. The screw shaft 22 is formed with a notch 40 providing a seat for receiving and holding the latch 38 adjacent its cranking position. It is also provided with an inclined shoulder 43 cooperating with the latch 38 to prevent the pinion assembly from drifting away from idle position.

It will be understood that a plurality of latches 38 may be provided, and the speed at which the latches will be withdrawn may be predetermined by suitable formation and calibration of the elastic members 39 in relation to the mass of the latch members 38.

In operation, starting with the parts in the positions shown in Fig. 1, rotation of the power shaft 1 in the direction of the arrow is transmitted through the sleeve 5 and coupling members 8 and 13, to the screw shaft 22, which causes the control nut 28 to traverse the pinion 26 into mesh with the engine gear 27, at which time the travel of the control nut 28 is arrested by the stop ring 24. Further rotation of the power shaft causes cranking torque to be transmitted to the engine gear, the coupling members 8, 13 being compressed by the screw-jack action of the control nut and screw shaft, forcing the driving coupling member 8 back against the elastic ring 14, as shown in Fig. 2. The backward movement of the driven coupling member 13 is limited by thrust ring 19 engaging against the ends of the splines 9 on sleeve 5. If, at the initiation of the cranking operation, excessive torque should be applied to the starter gear, the teeth 11, 12 of the coupling members compress the ring 14 sufficiently to disengage and slip off the excess torque.

When the engine starts, the acceleration of the pinion assembly to the predetermined speed causes withdrawal of the latch 38 from the notch 40 in the screw shaft, whereupon the parts are returned to idle position, undesired remeshing being prevented by the engagement of the latch 38 with the inclined shoulder 43 on the screw shaft.

Although but one embodiment of the invention has been shown and described in detail, it will be understood that changes may be made in the design and arrangement of the parts without departing from the spirit of the invention.

I claim:

1. In an engine starter drive a power shaft having a smooth reduced extension defined by a radial shoulder, a sleeve keyed on said extension, an abutment ring seated on said extension positioning the sleeve adjacent said shoulder, a driving coupling member non-rotatably mounted on the sleeve, a driven coupling member slidably journalled on the sleeve, said coupling members having interengaging inclined teeth, means resisting disengagement of said teeth including a ring of elastically deformable material and a collar holding said ring and the coupling members under axial compression; a screw shaft slidably journalled on said sleeve having an overrunning clutch connection with the driven coupling member, a pinion slidably journalled on the reduced extension of the power shaft for movement into and out of mesh with a gear of the engine to be started, a control nut threaded on the screw shaft, means for coupling the control nut to the pinion, and an abutment on the sleeve limiting the meshing movement of the control nut and pinion.

2. An engine starter drive as set forth in claim 1 in which said collar is provided with a radial flange resting on the reduced extension of the power shaft and confined between the shoulder of the power shaft and the adjacent end of the sleeve by the abutment which positions the sleeve.

3. In an engine starter drive, a power shaft, a screw shaft rotatably mounted thereon, an overrunning driving connection from the power shaft to the screw shaft, a pinion slidably journalled on the power shaft, a barrel member fixed at one end to the pinion and having a plurality of axially extending slots at its other end, a control nut threaded on the screw shaft having radial lugs engaging in the slots of the barrel, a latch member slidably mounted in one of said lugs for radial movement into and out of engagement with the screw shaft, an elastic compression member bearing on said latch, and means for confining and retaining the latch and compression member in said lug.

4. An engine starter drive as set forth in claim 3 in which said lugs are substantially flush with the external surface of the barrel, and the retaining means for the latch is in the form of a cup member anchored in the interior of the lug with its bottom substantially flush with the end of the lug.

No references cited.